(12) United States Patent
Luo et al.

(10) Patent No.: US 11,994,498 B2
(45) Date of Patent: May 28, 2024

(54) MARINE CLIMATE ENVIRONMENT-BENDING LOAD COLLABORATIVE ACCELERATION TEST METHOD FOR METAL MATERIAL

(71) Applicant: No.59 Institute of China Ordnance Industry, Chongqing (CN)

(72) Inventors: Laizheng Luo, Chongqing (CN); Shuai Wu, Chongqing (CN); Kun Zhou, Chongqing (CN); Xiaohui Wang, Chongqing (CN)

(73) Assignee: NO.59 INSTITUTE OF CHINA ORDNANCE INDUSTRY, Chongqing (CN)

( * ) Notice: Subject to any disclaimer, the term of this patent is extended or adjusted under 35 U.S.C. 154(b) by 0 days.

(21) Appl. No.: 17/609,287

(22) PCT Filed: Jun. 18, 2021

(86) PCT No.: PCT/CN2021/100945
§ 371 (c)(1),
(2) Date: Nov. 5, 2021

(87) PCT Pub. No.: WO2022/001703
PCT Pub. Date: Jan. 6, 2022

(65) Prior Publication Data
US 2023/0124950 A1 Apr. 20, 2023

(30) Foreign Application Priority Data
Jul. 3, 2020 (CN) .......................... 202010632149.7

(51) Int. Cl.
*G01N 3/32* (2006.01)
*G01N 3/20* (2006.01)

(52) U.S. Cl.
CPC ................ *G01N 3/32* (2013.01); *G01N 3/20* (2013.01); *G01N 2203/0003* (2013.01);
(Continued)

(58) Field of Classification Search
CPC .... G01N 3/32; G01N 3/20; G01N 2203/0003; G01N 2203/0007; G01N 2203/0023; G01N 2203/0073; G01N 2203/024; G01N 17/006
See application file for complete search history.

(56) References Cited

U.S. PATENT DOCUMENTS

2002/0070024 A1 * 6/2002 Schutz .................. E21B 33/038
166/350
2014/0238145 A1 * 8/2014 Tran .......................... G01N 3/20
73/851
(Continued)

FOREIGN PATENT DOCUMENTS

CN 113281202 A * 8/2021
EP 3362776 B1 * 1/2023 ............... G01N 3/20

*Primary Examiner* — Francis C Gray
(74) *Attorney, Agent, or Firm* — Tutunjian & Bitetto, P.C.

(57) ABSTRACT

A marine climate environment-bending load collaborative acceleration test method is provided, including conducting a static bending load loading test in an outdoor marine climate environment, conducting an alternate cycle of a dynamic bending load loading test in the outdoor marine climate environment and a test in the outdoor marine climate environment, and conducting an alternate cycle of the dynamic bending load loading test and the static bending load loading test in the outdoor marine climate environment. In the present disclosure, an acceleration rate of the marine climate environment-bending load collaborative acceleration test reaches over 8 times that of the test in the outdoor marine climate environment by taking the maximum bending force as an evaluation index, which may achieve a change from a static test to a static and dynamic combined test for exam- (Continued)

ining and evaluating the environmental adaptability of the metal material.

6 Claims, 2 Drawing Sheets

(52) U.S. Cl.
CPC ............... *G01N 2203/0007* (2013.01); *G01N 2203/0023* (2013.01); *G01N 2203/0073* (2013.01); *G01N 2203/024* (2013.01)

(56) References Cited

U.S. PATENT DOCUMENTS

2018/0275033 A1\* 9/2018 Troive ..................... G01N 3/28
2019/0226978 A1\* 7/2019 Li ........................ G01N 17/006

\* cited by examiner

MARINE CLIMATE ENVIRONMENT-BENDING LOAD COLLABORATIVE ACCELERATION TEST METHOD FOR METAL MATERIAL

CROSS REFERENCE TO RELATED APPLICATION

This patent application claims the benefit and priority of Chinese Patent Application No. 202010632149.7, filed to the China National Intellectual Property Administration on Jul. 3, 2020, and entitled "Marine Climate Environment-Bending Load Collaborative Acceleration Test Method for Metal material", the disclosure of which is herein incorporated by reference in its entirety.

TECHNICAL FIELD

The present disclosure relates to a marine climate environment-bending load collaborative acceleration test method for a metal material, and belongs to a technical field of environment tests.

BACKGROUND ART

The bending test is a test for determining mechanical properties of a material under a bending load, which are mainly used for testing bending strength of the material and checking surface quality of the material. Under the actions of environment and the bending load, a performance degradation rate of the metal material is far higher than that of the metal material under the action of the environment or the load alone. Furthermore, during a working period of coastal or offshore working equipment/devices, a large number of metal load-bearing structural parts withstand a comprehensive corrosion of multiple environmental factors such as high temperature, high humidity, high salt fog, strong solar radiation, and frequent alternation of drying and wetting, and are subjected to static or dynamic actions of the bending load. This collaborative action of marine atmospheric environment corrosion-bending load easily accelerates initiation and expansion of cracks of the materials and causes early fracture failure of key structural parts, which seriously threatens reliable and safe work of the equipment/devices.

At present, the bending performance tests of the metal materials are usually conducted at room temperature in laboratories. In addition, Chinese patents CN 105675406A and CN 105865936A respectively disclose methods for detecting the bending performance of a metal material at a high temperature and a low temperature, which detect the bending performance of the material at the high temperature/low temperature by adding a high-temperature/low-temperature test chamber on a universal material testing machine. These test methods are suitable for determining capability of the material to withstand bending plastic deformation at different ambient temperatures. However, the influence of the collaborative action of complex climate environment and bending load cannot be embodied in the test process, so these test methods are not suitable for testing the bending performance of the material under the collaborative action of the complex climate environment and the bending load.

It has an important academic value for enriching and developing material mechanical performance test methods and theories related to corrosion fatigue and the like, and has an important engineering application value for the design and material selection of the equipment/devices in marine climate environment and for improving the use performance, prolonging the service life, and the like to establish a marine climate environment-bending load collaborative test method to explore the bending performance degradation law of the metal materials under marine climate environment and static/dynamic action of the bending load.

SUMMARY

In view of the above-mentioned situations in the conventional art, the present disclosure provides a marine climate environment-bending load collaborative acceleration test method for a metal material, which overcomes disadvantages that the tests in traditional natural environment do not consider the influence of a load and laboratory tests are difficult to simulate the influence of complex marine climate environment, reflects the influence of the collaborative action of the corrosion of the marine climate environment and the bending fatigue load on the performance degradation of the metal material in a short time, and may be used for quickly evaluating the environmental adaptability of the metal material.

In order to achieve the above-mentioned object, the technical solution of the present disclosure is provided: a marine climate environment-bending load collaborative acceleration test method for the metal material, where a bending load loading device is placed in a real outdoor environment of marine climate. The test method includes:
(1) conducting a static bending load loading test in the outdoor marine climate environment, wherein, a continuous loading test is conducted on a test piece with a stress ratio of 1 and a static bending load of 0.3 $F_{bb}$ every day, within a test period of 10 to 45 days;
(2) conducting an alternate cycle of a dynamic bending load loading test in the outdoor marine climate environment and a test in the outdoor marine climate environment, wherein, a sine-wave loading waveform with a maximum dynamic bending load of 0.3 $F_{bb}$, a minimum dynamic bending load of 0.03 $F_{bb}$ and a frequency of 5 Hz, is loaded on the test piece for 15 minutes in the morning and 15 minutes in the afternoon every day, and the test in the outdoor marine climate environment is conducted in a rest of time, within a test period of 10 to 45 days;
(3) conducting an alternate cycle of a dynamic bending load loading test and a static bending load loading test in the outdoor marine climate environment, wherein, a sine-wave loading waveform with the maximum dynamic bending load of 0.3 $F_{bb}$, the minimum dynamic bending load of 0.03 $F_{bb}$, and the frequency of 5 Hz is loaded on the test piece for 15 minutes in the morning and 15 minutes in the afternoon every day, and a continuous loading test is conducted on the test piece with the static bending load of 0.3 $F_{bb}$ in the rest of time, within a test period of 10 to 45 days, where, the $F_{bb}$ is a maximum bending force of the metal material;

an acceleration rate of the static bending load loading test in the outdoor marine climate environment, the alternate cycle of the dynamic bending load loading test in the outdoor marine climate environment and the test in the outdoor marine climate environment, and the alternate cycle of the dynamic bending load loading test and the static bending load loading test in the outdoor marine climate environment, is evaluated relative to the test in the outdoor marine climate environment, by detecting the maximum bending force of the test piece every period until the test is ended and taking the maximum bending force as an environmental adaptability evaluation index of the metal material.

In an embodiment, in the test in the outdoor marine climate environment, the test piece is placed in a same real outdoor marine climate environment to detect, within performance detection period of 3 months, the maximum bending force of the test piece in each period.

In an embodiment, in the test in the outdoor marine climate environment, the test piece faces south and forms an inclination angle of 45° with a horizontal.

The present disclosure has beneficial effects as below:

(1) The collaborative action of the corrosion of the marine climate environment and the bending load suffered by the metal material in a service process is reflected actually. Test results are closer to actual use situations of the metal material. The disadvantages that the tests in natural environment do not consider the influence of the load and laboratory tests are difficult to simulate the influence of complex marine climate environment are overcome.

(2) A method for actually and quickly examining and evaluating the environmental adaptability of the metal material is provided. The acceleration rate of the marine climate environment-bending load collaborative acceleration test reaches over 8 times that of the test in the outdoor marine climate environment, which has significant acceleration and may meet the requirement on the quick examination and evaluation of the environmental adaptability of the metal material.

(3) Compared with the tests in the traditional natural environment, a change from a static test to a static and dynamic combined test is realized for the examination and evaluation of the environmental adaptability of the metal material.

DETAILED DESCRIPTION OF THE EMBODIMENTS

The present disclosure will be described below in detail in combination with specific embodiments and accompanying drawings.

Figure 1:
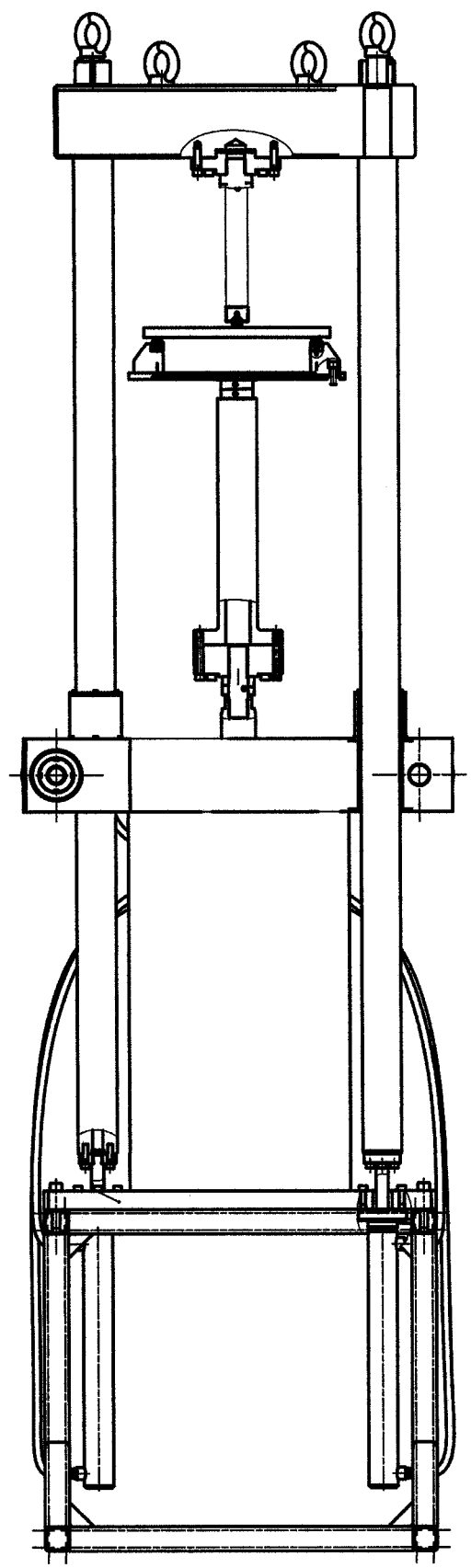
FIG. 1 is a load coupling test device for marine climate environment-pulling, pressing, and bending conditions.
Figure 2:
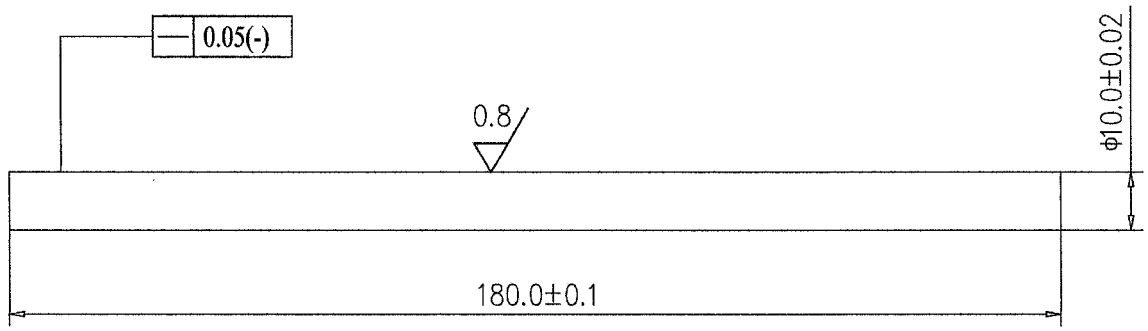
FIG. 2 is a dimension and specification drawing of a test piece.

FIG. 1 is a load coupling test device for marine climate environment-pulling, pressing, and bending conditions, which is mounted in a nearshore testing site of Hainan Wanning Test Station with typical hot and humid marine atmospheric environment. FIG. 2 shows a dimension and specification drawing of a test piece.

The test method of the present disclosure includes:

(1) Test in the Outdoor Marine Climate Environment

The test is conducted in the nearshore testing site of Hainan Wanning Test Station, where the test piece faces south and forms an inclination angle of 45° with the horizontal, the performance detection period is 3 months, namely four performance detections are performed in one year, and the maximum bending force of the test piece is detected in each period.

(2) Static Bending Load Loading Test in the Outdoor Marine Climate Environment

Test parameters include:

a static bending load: 0.3 $F_{bb}$, where $F_{bb}$ is the maximum bending force of the metal material;

a stress ratio: 1;

a test period: 10 to 45 days; and static bending load loading time: loading continuously until the test is ended.

(3) Alternate Cycle of a Dynamic Bending Load Loading Test in the Outdoor Marine Climate Environment and the Test in the Outdoor Marine Climate Environment Parameters of the dynamic bending load loading test in the outdoor marine climate environment include:

the maximum dynamic bending load: 0.3 $F_{bb}$, where $F_{bb}$ is the maximum bending force of the metal material;

the minimum dynamic bending load: 0.03 $F_{bb}$, where $F_{bb}$ is the maximum bending force of the metal material;

a dynamic bending loading frequency: 5 Hz;

a dynamic bending loading waveform: sine wave;

a test period: 10 to 45 days; and dynamic bending load loading time: loading twice a day, once in the morning and once in the afternoon, and 15 minutes each time.

The alternate cycle of the dynamic bending load loading test in outdoor marine climate environment and the test in the outdoor marine climate environment specifically includes the dynamic bending load loading test in the outdoor marine climate environment and the test in the outdoor marine climate environment alternately cycled with specific cycles as follows:

15 minutes of the dynamic bending load loading test in the outdoor marine climate environment (in the morning)+the test in the outdoor marine climate environment+15 minutes of the dynamic bending load loading test in the outdoor marine climate environment (in the afternoon)+the test in the outdoor marine climate environment+ . . . .

(4) Alternate Cycle of the Dynamic Bending Load Loading Test and the Static Bending Load Loading Test in the Outdoor Marine Climate Environment Parameters of the dynamic bending load loading test in the outdoor marine climate environment include:

the maximum dynamic bending load: 0.3 $F_b b$, where $F_{bb}$ is the maximum bending force of the metal material;

the minimum dynamic bending load: 0.03 $F_{bb}$, where $F_{bb}$ is the maximum bending force of the metal material;

the dynamic bending loading frequency: 5 Hz;

the dynamic bending loading waveform: sine wave;

the test period: 10 to 45 days;

the static bending load: 0.3 $F_{bb}$, where $F_{bb}$ is the maximum bending force of the metal material; and bending load loading time: loading the dynamic bending load twice a day, once in the morning and once in the afternoon, and 15 minutes each time, and the rest time being the static bending load loading time.

The alternate cycle of the dynamic bending load loading test and the static bending load loading test in the outdoor marine climate environment specifically includes the dynamic bending load loading test in the outdoor marine climate environment and the static bending load loading test in the outdoor marine climate environment alternately cycled with specific cycles as follows:

15 minutes of the dynamic bending load loading test in the outdoor marine climate environment (in the morning)+the static bending load loading test in the outdoor marine climate environment+15 minutes of the dynamic bending load loading test in the outdoor marine climate environment (in the afternoon)+the static bending load loading test in the outdoor marine climate environment+ . . . .

The present disclosure performs comparative analysis on acceleration performance of the marine climate environment-bending load collaborative acceleration test relative to that of the test in the outdoor marine climate environment based on the results of the test of outdoor marine climate environment, by taking the maximum bending force as an evaluation index.

Specifically, a bare material 7A09 aluminum alloy is selected as the test piece. The present embodiment describes the marine climate environment-bending load collaborative acceleration test method for the metal material of the present disclosure by taking the dynamic bending load loading test in the outdoor marine climate environment and the test in the outdoor marine climate environment as examples.

Figure 3:
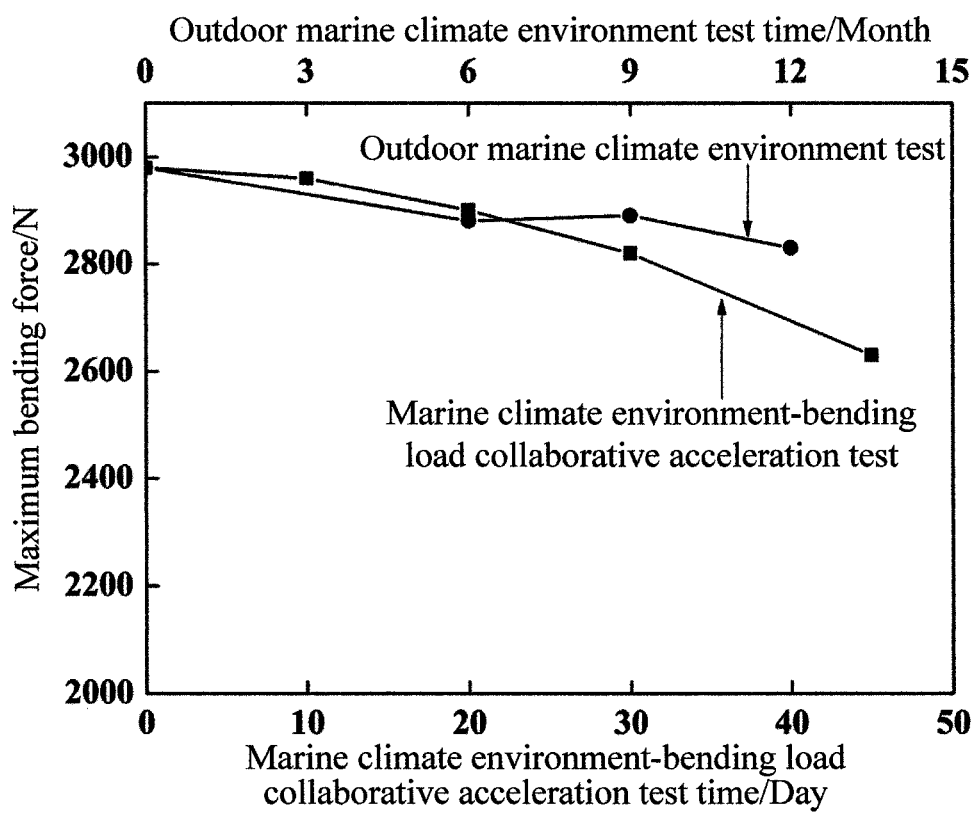
FIG. 3 shows maximum bending force comparison curves of 7A09 aluminum alloy in two tests.

FIG. 3 shows maximum bending force comparison curves of 7A09 aluminum alloy in two tests. It can be seen from FIG. 3 that the maximum bending force of the 7A09 aluminum alloy is reduced by 11.7% after 45 days of the marine climate environment-bending load collaborative acceleration test, and the maximum bending force of the 7A09 aluminum alloy is reduced by 5.0% after 1 year of the test in the outdoor marine climate environment. The result shows that the acceleration rate of the marine climate environment-bending load collaborative acceleration test reaches over 8 times that of the tests in the outdoor marine climate environment.

The technical solution provided by the embodiment of the present disclosure is described in details above. The principle and implementation of the present disclosure are illustrated herein by specific examples. The description of the above embodiment is only for helping to understand the principle of the embodiment of the present disclosure. Meanwhile, for those of ordinary skill in the art, there will be changes in specific implementation and application scope according to the embodiment of the present disclosure. In conclusion, the content of the specification should not be construed as a limitation to the present disclosure.

What is claimed is:

1. A marine climate environment-bending load collaborative acceleration test method for a metal material, wherein a bending load loading device is placed in a real outdoor marine climate environment, and the test method comprises:
   (1) conducting a static bending load loading test in the outdoor marine climate environment, wherein, a continuous loading test is conducted on a test piece with a stress ratio of 1 and a static bending load of 0.3 $F_{bb}$ every day, within a test period of 10 to 45 days;
   (2) conducting an alternate cycle of a dynamic bending load loading test in the outdoor marine climate environment and a test in the outdoor marine climate environment, wherein, a sine-wave loading waveform with a maximum dynamic bending load of 0.3 $F_{bb}$, a minimum dynamic bending load of 0.03 $F_{bb}$ and a frequency of 5 Hz, is loaded on the test piece for 15 minutes in the morning and 15 minutes in the afternoon every day, and the test in the outdoor marine climate environment is conducted in a rest of time, within a test period of 10 to 45 days; and
   (3) conducting an alternate cycle of a dynamic bending load loading test and a static bending load loading test in the outdoor marine climate environment, wherein, a sine-wave loading waveform with the maximum dynamic bending load of 0.3 $F_{bb}$, the minimum dynamic bending load of 0.03 $F_{bb}$, and the frequency of 5 Hz is loaded on the test piece for 15 minutes in the morning and 15 minutes in the afternoon every day, and a continuous loading test is conducted on the test piece with the static bending load of 0.3 $F_{bb}$ in the rest of time, within a test period of 10 to 45 days,
   wherein, the $F_{bb}$ is a maximum bending force of the metal material;
   an acceleration rate of the static bending load loading test in the outdoor marine climate environment, the alternate cycle of the dynamic bending load loading test in the outdoor marine climate environment and the test in the outdoor marine climate environment, and the alternate cycle of the dynamic bending load loading test and the static bending load loading test in the outdoor marine climate environment, is evaluated relative to the test in the outdoor marine climate environment, by detecting the maximum bending force of the test piece every period until the test is ended and taking the maximum bending force as an environmental adaptability evaluation index of the metal material.

2. The marine climate environment-bending load collaborative acceleration test method for the metal material according to claim 1, wherein, in the test in the outdoor marine climate environment, the test piece is placed in a same real outdoor marine climate environment to detect, within performance detection periods of 3 months, the maximum bending force of the test piece in each period.

3. The marine climate environment-bending load collaborative acceleration test method for the metal material according to claim 2, wherein, in the test in the outdoor marine climate environment, the test piece faces south and forms an inclination angle of 45° with a horizontal.

4. A marine climate environment-bending load collaborative acceleration test method for a metal material, wherein a bending load loading device is placed in a real outdoor marine climate environment, and the test method comprises:
   (1) conducting a test in the outdoor marine climate environment, wherein the test piece is placed in a same real outdoor marine climate environment to detect, within performance detection periods of 3 months, a maximum bending force of the test piece in each period;
   (2) conducting a static bending load loading test in the outdoor marine climate environment, wherein
   test parameters comprise:
   a static bending load: 0.3 $F_{bb}$, wherein $F_{bb}$ is the maximum bending force of the metal material;
   a stress ratio: 1;
   a test period: 10 to 45 days; and
   static bending load loading time: loading continuously until the test is ended;
   (3) conducting an alternate cycle of a dynamic bending load loading test in the outdoor marine climate environment and a test in the outdoor marine climate environment, wherein
   parameters of the dynamic bending load loading test in the outdoor marine climate environment comprise:
   a maximum dynamic bending load: 0.3 $F_{bb}$, wherein $F_{bb}$ is the maximum bending force of the metal material;
   a minimum dynamic bending load: 0.03 $F_{bb}$, wherein $F_{bb}$ is the maximum bending force of the metal material;
   a dynamic bending loading frequency: 5 Hz;
   a dynamic bending loading waveform: sine wave;
   a test period: 10 to 45 days; and
   dynamic bending load loading time: loading twice a day, once in the morning and once in the afternoon, and 15 minutes each time;
   the alternate cycle comprises the dynamic bending load loading test in the outdoor marine climate environment and the test in the outdoor marine climate environment;

and the dynamic bending load loading test in the outdoor marine climate environment and the test in the outdoor marine climate environment are alternately cycled in sequence;

(4) conducting an alternate cycle of a dynamic bending load loading test and a static bending load loading test in the outdoor marine climate environment, wherein parameters of the dynamic bending load loading test in the outdoor marine climate environment comprise:

the maximum dynamic bending load: 0.3 $F_{bb}$, wherein $F_{bb}$ is the maximum bending force of the metal material;

the minimum dynamic bending load: 0.03 $F_{bb}$, wherein $F_{bb}$ is the maximum bending force of the metal material;

the dynamic bending loading frequency: 5 Hz;

the dynamic bending loading waveform: sine wave;

the test period: 10 to 45 days;

the static bending load: 0.3 $F_{bb}$, wherein $F_{bb}$ is the maximum bending force of the metal material;

bending load loading time: loading the dynamic bending load twice a day, once in the morning and once in the afternoon, and 15 minutes each time, and the rest time being the static bending load loading time.

5. The marine climate environment-bending load collaborative acceleration test method for the metal material according to claim 4, wherein an evaluating method comprises: performing comparative analysis on acceleration performance of the marine climate environment-bending load collaborative acceleration test relative to that of the test in the outdoor marine climate environment, based on results of the test in the outdoor marine climate environment, by taking the maximum bending force as an evaluation index.

6. The marine climate environment-bending load collaborative acceleration test method for the metal material according to claim 4, wherein in the test in the outdoor marine climate environment, the test piece faces south and forms an inclination angle of 45° with a horizontal.

\* \* \* \* \*